March 4, 1947. W. B. BRONANDER 2,416,865
MACHINE FOR FORMING AND WINDING FIN STRIPS
Filed Jan. 20, 1944 6 Sheets-Sheet 1
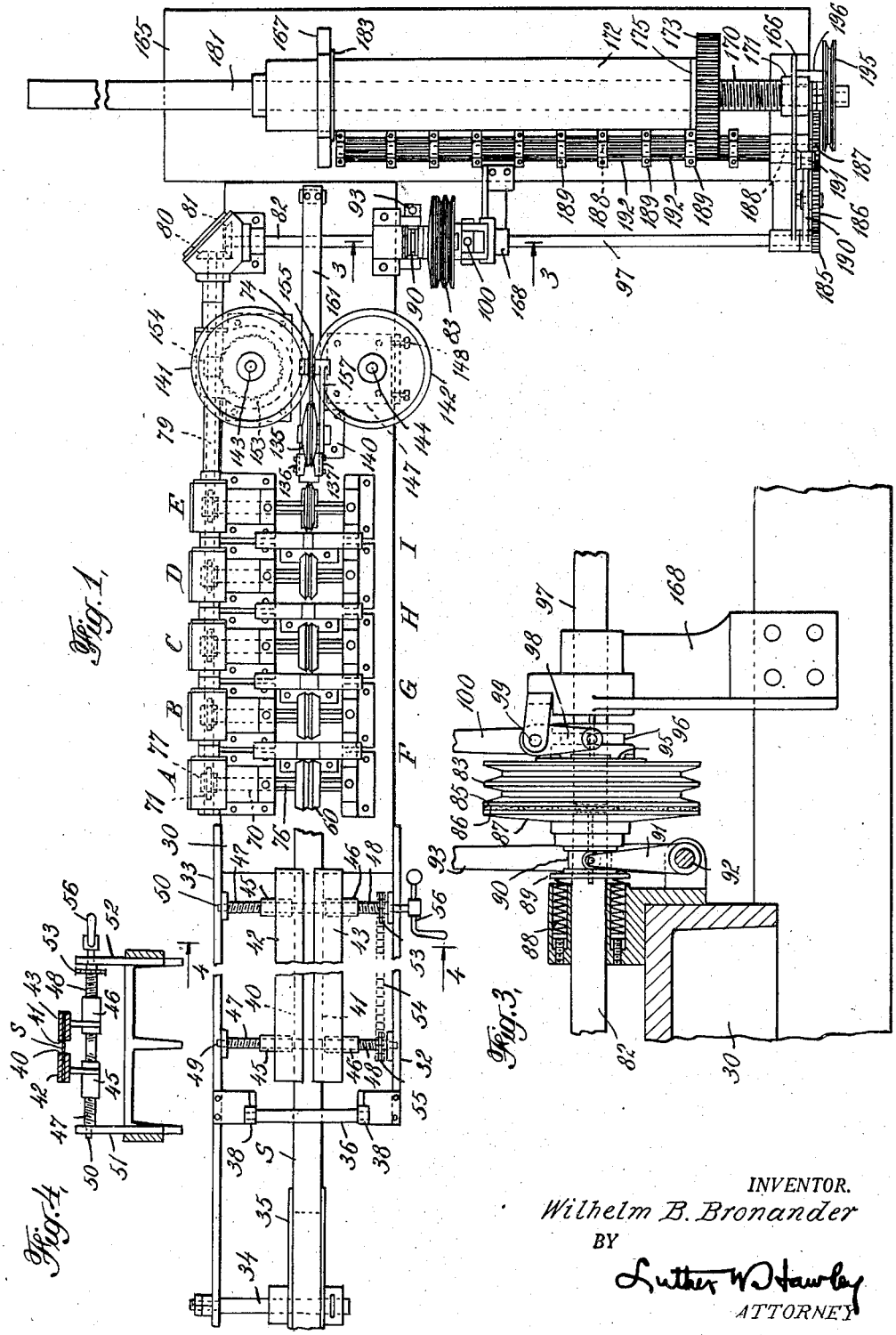
INVENTOR.
Wilhelm B. Bronander
BY
Luther W. Hawley
ATTORNEY

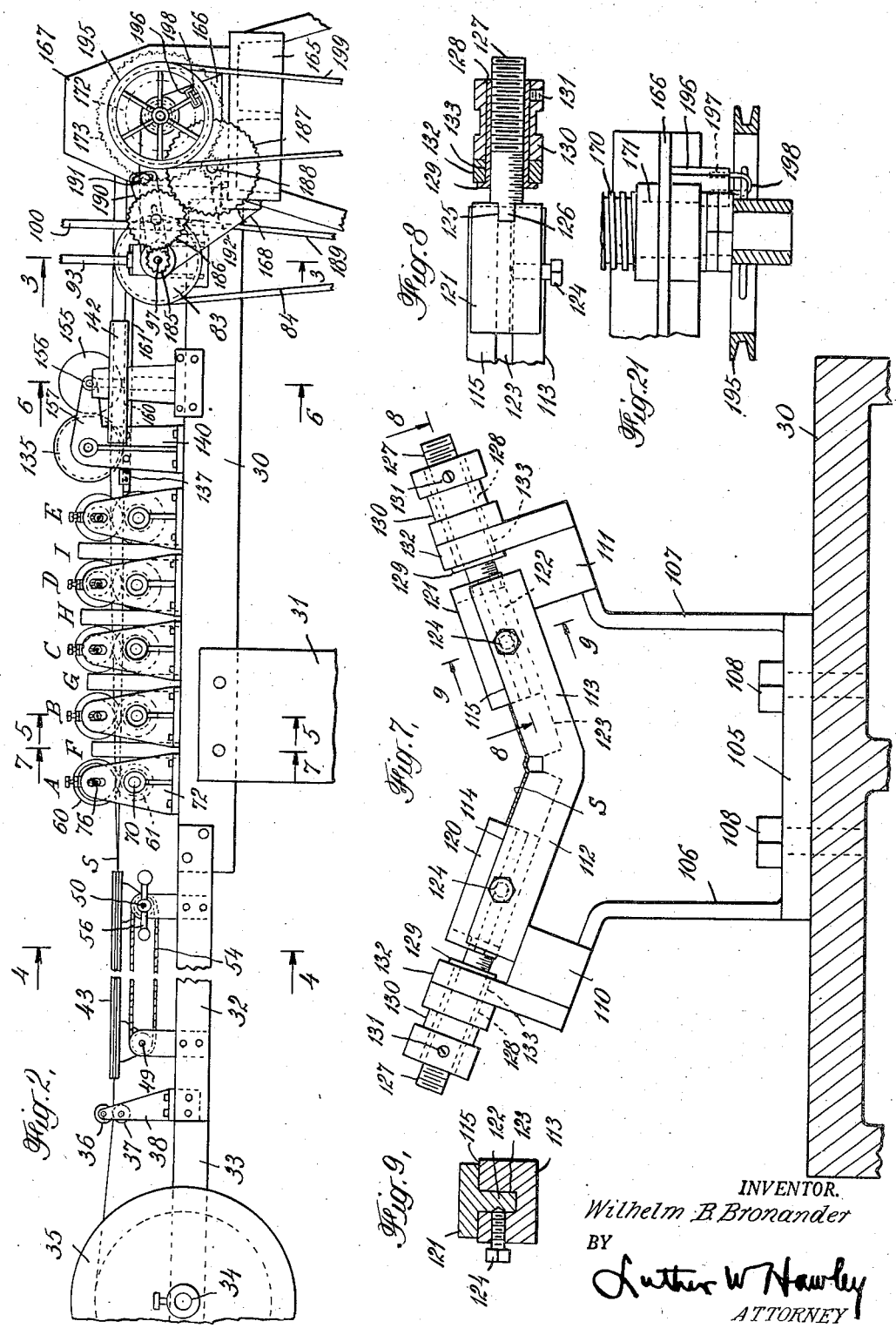

March 4, 1947. W. B. BRONANDER 2,416,865
MACHINE FOR FORMING AND WINDING FIN STRIPS
Filed Jan. 20, 1944 6 Sheets-Sheet 3
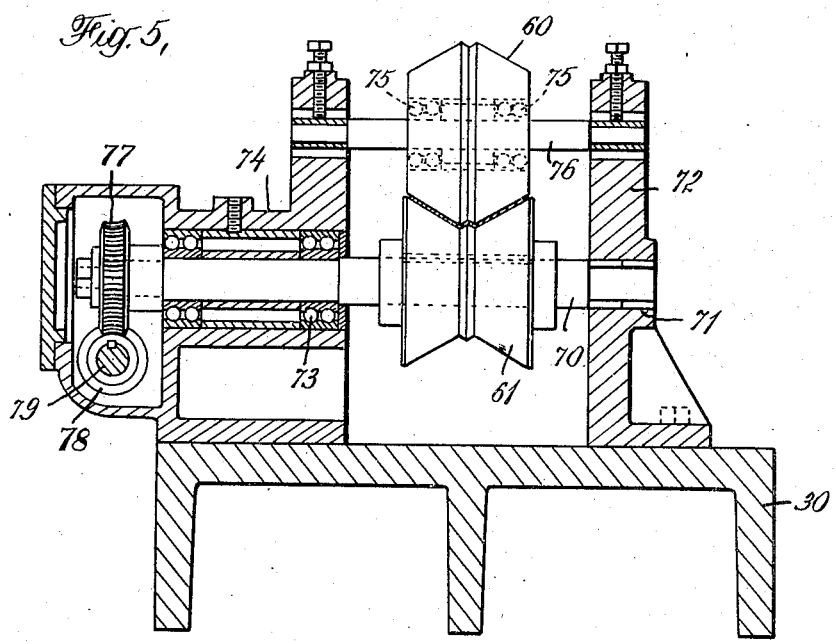
Fig. 5,
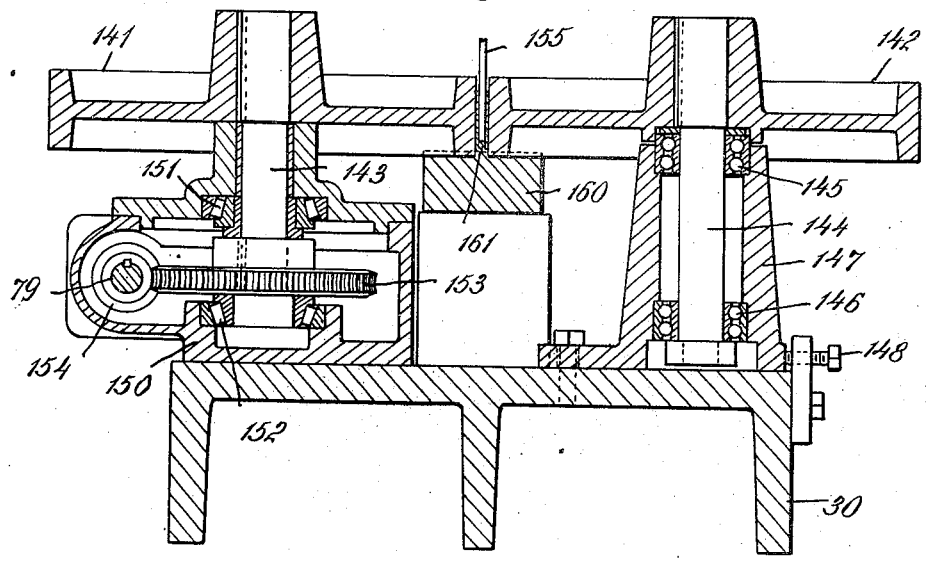
Fig. 6,
INVENTOR
Wilhelm B. Bronander
BY
Luther W. Hawley
ATTORNEY March 4, 1947. W. B. BRONANDER 2,416,865
MACHINE FOR FORMING AND WINDING FIN STRIPS
Filed Jan. 20, 1944 6 Sheets-Sheet 4

INVENTOR.
Wilhelm B. Bronander
BY
Luther W. Hawley
ATTORNEY

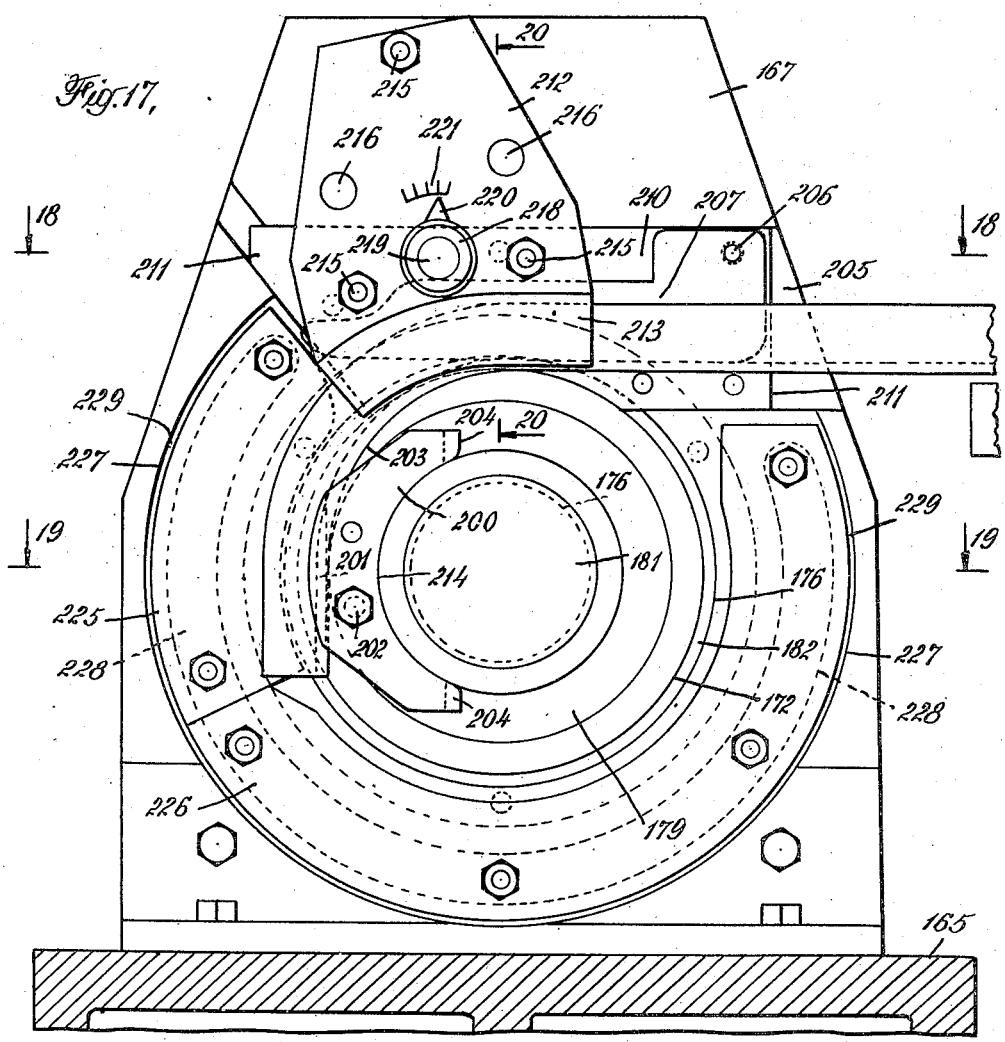
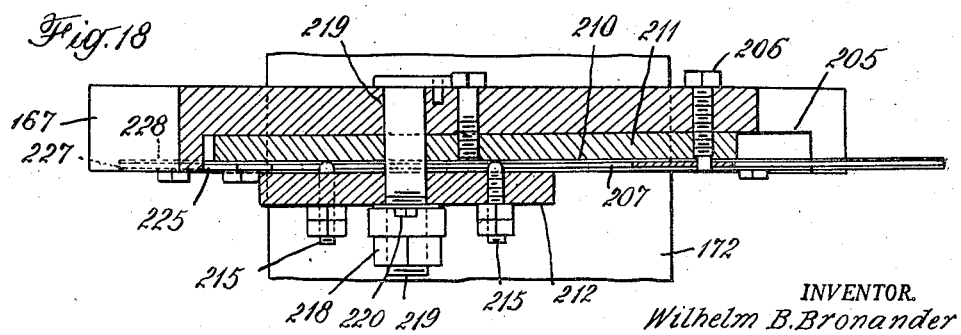

March 4, 1947.  W. B. BRONANDER  2,416,865
MACHINE FOR FORMING AND WINDING FIN STRIPS
Filed Jan. 20, 1944.  6 Sheets-Sheet 6
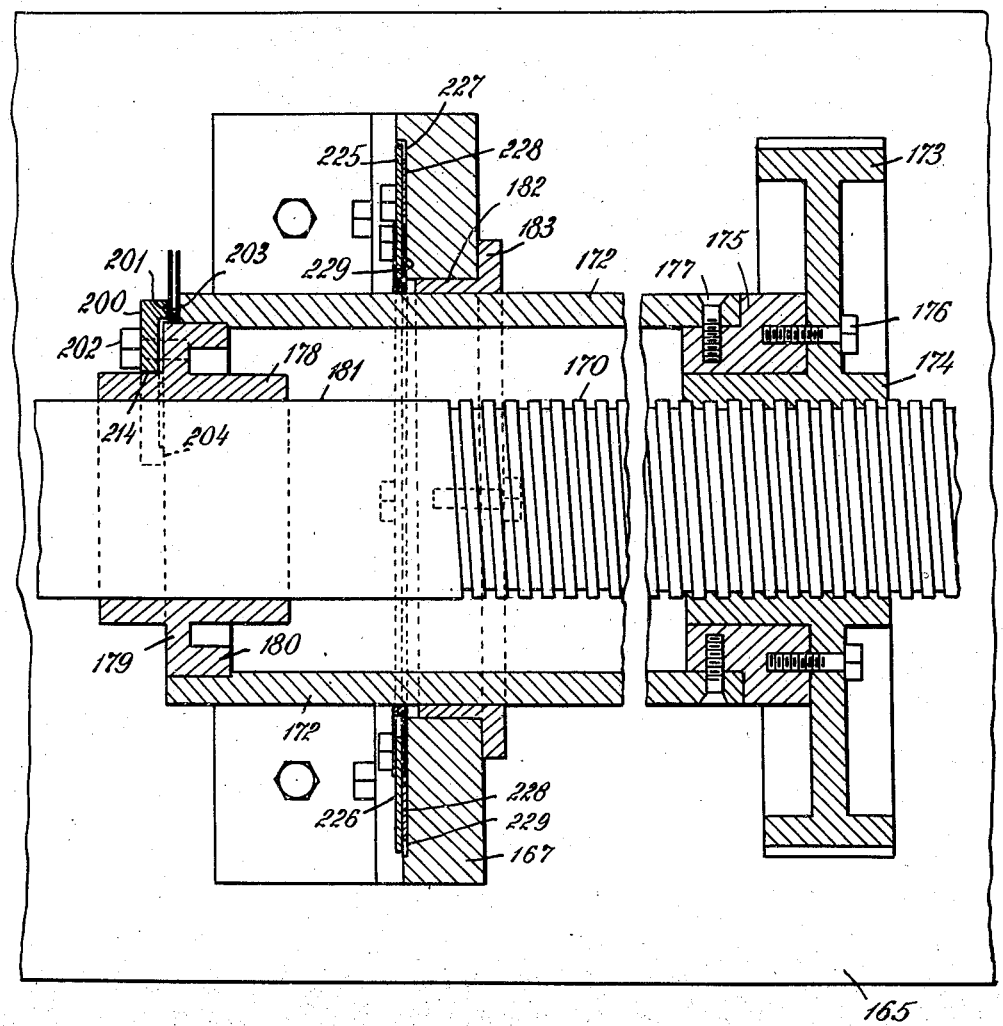
INVENTOR.
Wilhelm B. Bronander
BY
ATTORNEY Patented Mar. 4, 1947

2,416,865

UNITED STATES PATENT OFFICE 2,416,865

MACHINE FOR FORMING AND WINDING FIN STRIPS

Wilhelm B. Bronander, Montclair, N. J.

Application January 20, 1944, Serial No. 519,012

5 Claims. (Cl. 153—2)

This invention relates to a machine for forming a double walled fin and for winding the fin into a spiral coil.

The invention has for its salient object to provide a machine of the character described for efficiently and expeditiously forming a strip of material into a double walled fin and for winding the fin into a spiral coil in a continuous operation.

Another object of the invention is to provide a machine of the character described so constructed and arranged that the coiled fin can be quickly stripped or removed from the mandrel on which it is wound.

Further objects of the invention will appear from the following description taken in connection with the drawings which form a part of this application, and in which Fig. 1 is a top plan view of a machine constructed in accordance with the invention;

Fig. 2 is a side elevation of the machine shown in Fig. 1;

Fig. 3 is an enlarged sectional elevation taken substantially on line 3—3 of Fig. 1, looking in the direction of the arrows, and showing the clutch and driving connections for the strip folding means and mandrel rotating means;

Fig. 4 is a sectional elevation taken substantially on line 4—4 of Fig. 2, looking in the direction of the arrows;

Fig. 5 is a sectional elevation taken substantially on line 5—5 of Fig. 2, looking in the direction of the arrows;

Fig. 6 is a sectional elevation taken substantially on line 6—6 of Fig. 2, looking in the direction of the arrows;

Fig. 7 is a sectional elevation taken substantially on line 7—7 of Fig. 2, looking in the direction of the arrows, this view being taken on an enlarged scale;

Fig. 8 is a sectional elevation taken substantially on line 8—8 of Fig. 7, looking in the direction of the arrows;

Fig. 9 is a sectional elevation taken substantially on line 9—9 of Fig. 7, looking in the direction of the arrows;

Figure 15:
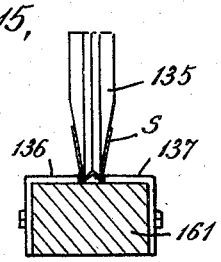
Figure 16:
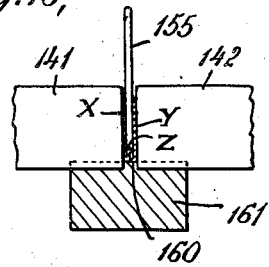
Figure 20:
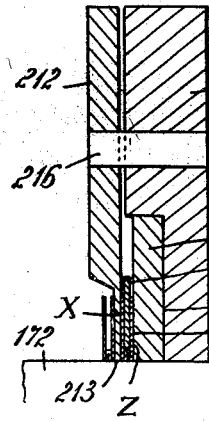

Figs. 10 to 14 inclusive are elevational views, partly broken away, showing the successive strip bending or folding and feeding rolls;

Fig. 15 is an elevational view, partly in section, of the feeding and guiding means for the folding strip;

Fig. 16 is an elevational view, partly in section, showing the horizontally rotating rolls which complete the strip folding operation and press the double walls of the fin strip into parallel relation with each other;

Fig. 17 is an elevational view illustrating the strip guiding mechanism for guiding the fin around the mandrel and for frictionally engaging the strip;

Fig. 18 is a sectional elevation taken substantially on line 18—18 of Fig. 17, looking in the direction of the arrows;

Fig. 19 is a sectional elevation taken substantially on line 19—19 of Fig. 17, looking in the direction of the arrows;

Fig. 20 is a detail sectional elevation taken substantially on line 20—20 of Fig. 17, looking in the direction of the arrows;

Fig. 21 is a detail sectional elevation illustrating the holding means for holding from rotation the screw, on which the mandrel is mounted for rotation during the strip winding operation; and Fig. 22 is an elevational view of the coiled fin strip.

The invention briefly described consists of a machine constructed and arranged to fold a strip of material into a double walled fin and to wind this fin into a spiral coil in a continuous operation. The folding means consists of a plurality of sets of successively acting forming or folding rolls which fold the strip into a double walled fin with the walls spaced and disposed in substantially parallel relation, the walls at the connected edges thereof having disposed therebetween compressible material which fills the space between these connected edges.

From the folding means the double walled fin is guided to a mandrel which is rotated and moved longitudinally and the advance end of the fin is secured to one end of the mandrel and the fin is guided to the mandrel periphery and is frictionally engaged whereby the rotation and longitudinal movement of the mandrel stretches the outer edge of the fin and winds the fin into a spiral coil around the cylindrical surface of the mandrel. After the fin has been so wound the fastening between the fin and the mandrel is removed and the mandrel is withdrawn longitudinally from the coil. Further details of the invention will appear from the following specification.

In the particular embodiment of the invention illustrated, the machine is mounted on a base 30 which is suitably supported on legs 31. At one end of the base 30 are secured bars or frame members 32 and 33, the bar 33 carrying a spindle 34 on which is mounted a reel 35 for the strip S.

From the reel 35 the strip is led between a pair of freely rotatable guide rolls 36 and 37 carried by brackets 38, which in turn are mounted on the bars 32 and 33.

From the guide rolls 36 and 37 the strip passes through a pair of channels or guides 40 and 41 shown particularly in Figs. 1 and 4. The channels 40 and 41 are formed in channel bars 42 and 43 which are carried by threaded sleeves 45, 45 and 46, 46. The sleeves 45 and 46 are mounted on screw threads 47 and 48 formed on spindles 49 and 50 mounted in brackets 51 and 52. As illustrated in Figs. 1 and 4, the threads 47 and 48 are reversed or, in other words, are right and left hand threads.

The spindle 50 has fixed thereon a sprocket 53 which is connected by a chain 54 to a sprocket 55 mounted on the spindle 49. A crank 56 is secured to the spindle 50 and as this crank is rotated the spindles 49 and 50 will be rotated, causing the channel bars 42 and 43 to move toward or away from each other to accommodate different widths of strips.

*Strip folding mechanism*

From the strip guiding means shown particularly in Fig. 4 and above described, the strip S passes successively through a plurality of sets of feeding and folding rolls indicated on Figs. 1 and 2 as A, B, C, D and E. These rolls are also shown respectively in Figs. 10, 11, 12, 13 and 14. Each set of rolls comprises an upper roll 60 and a lower roll 61. The lower roll of each set has a centrally disposed ledge 62 having the shape of an inverted V and the upper roll has a correspondingly shaped centrally disposed groove 63.

The upper roll 60 has conical surfaces 64 and 65 and the lower roll 61 has correspondingly shaped concave surfaces 66 and 67.

Figure 10:
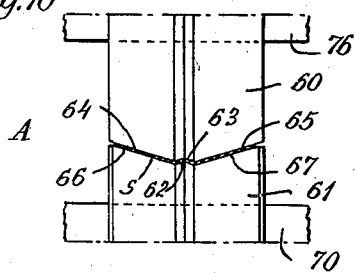

In the construction shown in Fig. 10, the strip S is being fed between the rolls 60 and 61, the portions of the strip disposed laterally of the longitudinal center thereof being folded upwardly at a slight angle and the projection 62 and groove 63 forming an inverted V having a wide angle at the central longitudinal portion of the strip.

Figure 14:
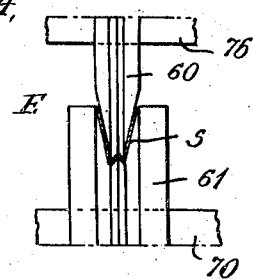
Figure 11:
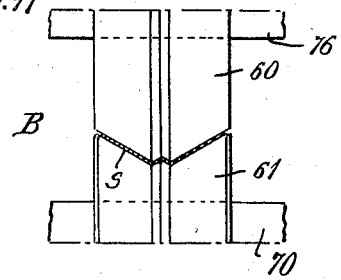
Figure 12:
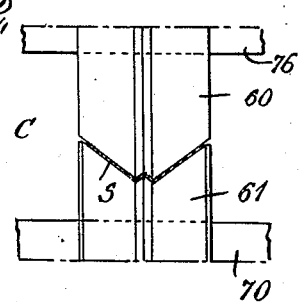
Figure 13:
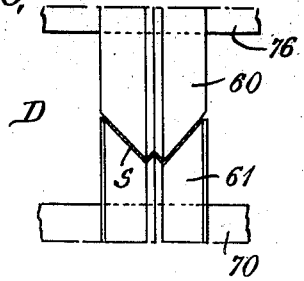

The rolls 60 and 61 shown in Figs. 11, 12, and 13 are similar to those shown in Fig. 10, but the angles of conical portions and concave portions are made increasingly steeper so that in Fig. 14 the portions of the strip disposed laterally of the central longitudinal portion thereof are bent upwardly at an acute angle.

Fig. 5 illustrates the mounting of the rolls 60 and 61. As shown in this figure, the roll 61 is keyed to a shaft 70 having its end mounted in a bearing 71 in a bearing bracket 72, which in turn is mounted on the base 30 of the machine. The shaft 70 is also mounted in a ball bearing 73 carried by a bracket 74, which in turn is carried by the base 30.

The roll 60 is freely rotatable in ball bearings 75 mounted on a shaft 76 which is vertically adjustable in the brackets 72 and 74.

The end of the shaft 70 beyond the ball bearing 73 has keyed thereon a worm gear 77 which meshes with a worm 78 keyed to a shaft 79.

Shaft 79 is connected by bevel gears 80 and 81 to a shaft 82 which is driven through clutch mechanism, hereinafter described, from a pulley 83. The pulley 83 is driven by a belt 84 from a motor or any other suitable source of power not shown.

The clutch between the pulley 83 and the shaft 82 may be constructed in the manner shown particularly in Fig. 3. In this figure the pulley 83 is provided with a surface or face 85 which frictionally engages a friction surface 86 formed on a clutch disk 87. The disk 87 is normally pressed toward the pulley 83 to frictionally engage the surfaces 85 and 86 by springs 88 which engage a washer 89 which in turn presses against a clutch yoke 90 slidably mounted on the shaft 82. An arm 91 engages the clutch yoke and is pivoted on a shaft 92 to which is also secured a clutch handle or lever 93 by means of which the arm 91 may be actuated in an anti-clockwise direction to disengage the friction drive between the surfaces 85 and 86.

The pulley 83 which forms the central part or member of a double clutch is provided with teeth adapted to engage corresponding teeth 95 formed on a clutch yoke 96 splined on a shaft 97. The clutch yoke is engaged by an arm 98 mounted on a pivot or shaft 99 to which is also secured a clutch shifting lever 100. When the teeth on the pulley are engaged by the teeth 95, the shaft 97 will be driven from the pulley 83.

Each of the sets of folding or bending rolls A, B, C, D and E is driven in the same manner as that illustrated in Fig. 5 and hereinbefore described and, therefore, the separate driving connections for each set of rolls need not be further described.

Intermediate the sets of bending rolls A to E inclusive, are provided supporting and guiding means for insuring the correct positioning of the strip S as it passes from one set of rolls to the next set. These guiding means are illustrated in Fig. 2 at F, G, H and I. Fig. 7 illustrates the construction of these intermediate positioning and guiding means. As shown in this figure, a bracket comprising a base 105 and vertical arms 106 and 107 is secured by bolts 108 to the base 30. On the upper ends of the arms 106 and 107 are formed blocks 110 and 111 on which is supported a V-shaped member having arms 112 and 113. The upper surfaces 114 and 115 of the arms 112 and 113 are so inclined relative to each other as to conform to the angle to which the strip has been bent by the preceding set of bending rolls.

In order that the strip S may be held in correct alinement and against lateral deviation therefrom, T-shaped blocks 120 and 121 are adjustably mounted on the arms 112 and 113, these blocks having a central rib 122 which is slidable in a longitudinal channel or slot 123 formed in the arm 112 or 113. The blocks 120 are held in adjusted position by a set screw 124.

In order to accurately adjust the blocks 120 and 121, these blocks are recessed at their outer ends, as shown at 125, to receive a reduced end 126 on a threaded stud 127. A sleeve 128 is threaded on each stud and has a flange 129 at the inner end thereof. Each sleeve 128 has a sleeve 130 mounted thereon and secured thereto by a set screw 131.

Each of the blocks 110 and 111 has an extension 132 provided with an opening 133 at its outer end which receives the threaded sleeve 128. The flange 129 is disposed on one side of the extension 132 and the outer sleeve 130 is disposed on the other side thereof. Thus, as the outer sleeve 130 is rotated, the inner sleeve will be rotated, but endwise movement of this sleeve is prevented by the flange 129 and the inner end of the sleeve 130. Therefore, the rotation of the sleeves 130 and 128 will cause the threaded stud 127 to move inwardly or outwardly as the case may be. The T-shaped blocks 120 and 121 can, therefore, be accurately adjusted by rotating the sleeves 128 and 130 and after adjustment these blocks are locked in position by the set screws 124.

After the folded strip has passed between the last pair of bending or folding rollers indicated at E, the strip is fed beneath the roll 135, shown particularly in Fig. 15, and between guide members 136 and 137 mounted on a bar 161. The roll 135 is mounted in a bracket 140 for free rotation and is not positively driven. From the roll 135 the strip then passes between a pair of rolls 141 and 142, which are illustrated particularly in Fig. 6. These rolls have cylindrical surfaces and are mounted on vertical shafts 143 and 144. The shaft 144 is mounted in ball bearings 145 and 146 for free rotation therein, these bearings being carried by a bracket 147 which is adjustably mounted on the base 30 and is adjustable thereon by a threaded bolt 148.

The shaft 143 is carried by a bracket 150 also mounted on the base 30, this shaft being mounted in roller bearings 151 and 152. Shaft 143 has secured thereto a worm gear 153 which meshes with a worm 154 carried by the shaft 79.

As shown in Figs. 1, 2 and 16, a disk wheel 155 is mounted on a horizontal spindle 156 and projects downwardly intermediate the cylindrical surfaces of the rolls 141 and 142. The spindle 156 is carried by a bracket 157 supported on bracket 140. The disk 155 is freely rotatable and extends between the upwardly extending walls X and Y of the folded strip S. These walls are folded into parallel relation with each other by the rolls 141 and 142 and the inverted V portion of the strip disposed centrally thereof is folded upwardly, as shown at Z in Fig. 16. This portion Z fills the space between the connected edges of the walls X and Y of the strip S. The strip is supported by a ridge or relatively narrow supporting portion 160 on the bar 161 which is recessed on its upper surface to receive the inner portions of the rolls 141 and 142, thereby forming the ridge 160. The bar 161 extends forwardly, as shown in Fig. 1, approximately to the end of the table or base 30.

*Fin winding mechanism*

At the delivery end of the supporting table or base 30 there is mounted at right angles thereto a supporting table 165 on which are mounted the various parts of the winding mechanism for winding the fin strip into a coil.

The table 165 supports a bracket 166 at the outer end thereof and a bracket 167 intermediate the ends thereof and approximately in alinement with the center lines of the bending and feeding rolls and path of movement of the fin. Bracket 167 is particularly shown in Figs. 1, 17 and 19.

Bracket 166 is provided with a lateral extension which supports the shaft 97, this shaft also being supported by a bracket 168.

A screw threaded shaft 170 is supported at 171 in the bracket 166 and has mounted thereon a mandrel 172. The mandrel has connected to one end thereof a gear 173, as shown particularly in Fig. 19. This gear has a threaded hub 174 mounted on the screw threaded shaft 170.

In order to provide for different sizes of mandrels, a sleeve 175 is secured to the gear 173 by bolts 176 and is secured to the mandrel by screws 177. This sleeve may be varied in size to accommodate mandrels having different diameters. At the opposite end of the mandrel there is secured a sleeve or bushing 178 having a laterally extending web 179 on the outer end of which is formed a flange 180 which fits within the outer end of the mandrel and is secured therein. The sleeve or bushing 178 forms a support for the cylindrical outer end 181 of the screw threaded shaft 170 and thus supports the shaft.

The mandrel is supported at a point substantially in alinement with the direction of feeding movement of the fin by a bushing 182 which is carried by the bracket 167. Bushing 182 has a flange 183. As the gear 173 is driven in the manner hereinafter described, the gear and the mandrel carried thereby will move longitudinally as the fin is coiled on the mandrel and during this movement the mandrel slides through the bushing 182.

The gear 173 is driven in the following manner: Shaft 97 has secured to the outer end thereof a gear 185 which meshes with an idler gear 186, which in turn meshes with a gear 187 carried by a shaft 188 mounted in bearings carried by a plurality of brackets 189. The idler gear 186 is mounted on an arm 190 pivoted on the shaft 97 and adjustably secured at its opposite end, as shown at 191. This provides for a variation in the size of the idler and thus a change in the gear ratio.

The shaft 188 has secured thereto a plurality of gears 192 which are spaced apart but are successively engageable by the gear 173 as this gear moves along the threaded shaft 170. The gear 173 is sufficiently wide to bridge the gap between the gears 192 so that a constant driving contact between the gears 189 and the gears 173 will be maintained.

As the shaft 97 is driven through the clutch mechanism illustrated particularly in Fig. 3 and hereinbefore described, the gears 185, 186 and 187 will drive the shaft 188 and the gears 192 will thereupon drive the gear 173 which, because of its threaded connection to the shaft 170, will travel along this shaft which at this period in the operation of the machine is held stationary or against rotation. This is insured by the locking means illustrated particularly in Fig. 21 and also shown in Fig. 2. The shaft 170 has mounted on the outer end thereof a pulley 195 which, as shown in Fig. 2, has a plurality of spokes. The bracket 166 which supports the end of the threaded shaft 170 has formed thereon a projection 196 having therein a pair of holes 197 which are adapted to receive the shanks of a U-shaped staple or locking member 198. This member is used in the manner shown particularly in Figs. 2 and 21 to embrace one of the spokes of pulley 195 and in this manner to positively prevent any rotation of the shaft 170.

In order to drive the threaded shaft 170 to strip the wound coil from the mandrel in a manner hereinafter described, the pulley 195 is positively driven by a belt 199 which is driven by a separate motor or any other suitable source of power. However, before describing this operation, the means for securing the advance end of the fin to the mandrel and for guiding the fin around the mandrel and frictionally engaging the fin as it is wound thereon, will be described.

*Fin securing and guiding means*

This means is illustrated particularly in Figs. 17 to 19 inclusive. As above described, a bracket 167 is mounted on the supporting table 165 in a position substantially in alinement with the path of movement of the double walled fin after the fin has been passed between the compressing rolls 142 and 143, shown in Fig. 16, which fold the portions X and Y of the fin into vertical position and substantially parallel relation.

The advance end of the fin is secured to the end of the mandrel, as shown in Fig. 19, by a clamp which comprises a plate 200 having a knurled flange 201. This clamp is secured by a bolt 202 to the web 179.

The outer end of the mandrel 172 is cut away to form an inclined recess 203 which receives the advance end of the fin and guides the fin onto the peripheral surface of the mandrel.

The bracket 167 is recessed, as shown at 205 in Figs. 18 and 19, and in the recess 205 there is mounted on a pin 206 a finger 207 which during the winding of the fin is received between the walls X and Y of the fin. The finger rests on the portion Z intermediate the walls.

The fin is held against a surface 210 of a plate or bar 211 which is disposed in the recess 205 of the bracket 167 in back of the finger 207 by a plate 212 which has a reduced lower end portion or finger 213. This finger presses against the outer wall of the fin and presses the fin wall, finger 207 and inner fin wall against the outer surface of the plate or bar 211. It will be understood that the advance end of the fin is clamped against the outer end of the mandrel 172, as shown in Fig. 19 and as hereinbefore described. This clamp has an arcuate surface 214 which fits against the cylindrical surface of the portion of the bushing 178 and also has lugs 204 which engage the outer surface of the web 179.

It will be evident that as the double walled fin is wound around the mandrel the outer portions of the walls must be stretched since the circumference of the outer portions is materially greater the circumference of the inner portions. In order that this may be accomplished it is essential that sufficient pressure be placed on the fin by the plate 212 and that the amount of pressure be accurately gauged and determined. Three adjustable set screws or bolts 215 are carried by the plate 212 and these bolts are threaded through the plate until their inner ends project therethrough the desired amount to properly space the plate 212 from the outer surface of the bar or plate 211. The plate 212 is slidably mounted on dowel pins 216. When bolts 215 have been properly adjusted the nuts and nut locks thereon are tightened to secure these set screws in the proper position.

The plate is held securely in position by means of a nut 218 mounted on a bolt 219. This nut has an indicator 220 which, in conjunction with a scale 221 formed on the outer surface of the plate 212, shows the position of adjustment of the plate and indicates in this manner the amount of pressure being exerted thereby against the fin.

The fin coil is guided around the mandrel 172 by means of a pair of clamping plates 225 and 226 which are arcuate in shape and extend into the space between the fin walls and clamp the fin against the outer surface of the bracket 167. As indicated in Fig. 19, the bracket is provided with a circumferential spiral recess 227. A flat spacer 228 spaces the clamping plates 225 and 226 from the surface 229 of the bracket 167.

In the manner just described the fin is firmly and frictionally held as it is wound around the mandrel, thus forming a tight coil and causing the inner circumference of the fin coil to conform to the outer circumference of the mandrel.

After the fin has been wound around the mandrel it is released therefrom in the following manner:

The motor or driving source for the pulley 83 is cut off, thus stopping the rotation of the gear 173 on the threaded shaft 170. The clamp 200 which clamps the fin to the end of the mandrel is then loosened, thereby freeing the end of the fin. Thereupon the staple 198 which holds the pulley 195 from rotation is removed and the motor or other source of power which drives the belt 199 is then started, causing the pulley 195 to rotate in a direction to revolve the threaded shaft 170. This shaft is rotated in a direction to cause the mandrel to be moved longitudinally since the threaded hub 174 of the gear 173 on the mandrel is held against rotation, thereby causing the mandrel 172 to be drawn longitudinally through the bushing 182. The fin is severed after it has been wound on the mandrel and the severed end is held by the bracket 167 as the mandrel is withdrawn, it being understood that the last portion of the fin wound on the mandrel is loosened from the clamping plates which hold it in position. The fin coil then drops on the projecting end 181 of the shaft 170 and can be removed therefrom.

*Summary of operation of the machine*

As hereinbefore described, the fin strip S is led from the reel 35 through the guide channels 40 and 41 and between the successive bending rolls A, B, C, D and E. From the rolls of the set E the strip is then led beneath the roll 135 and between the compressing rolls 141 and 142 which fold and compress the strip to its final form in which the walls X and Y of the double walled fin are substantially parallel and the inwardly folded portion Z fills the space between the connected edges of the walls.

From the rolls 141 and 142 the strip is led to the winding mechanism, the advance end being clamped in the manner shown in Fig. 19 to the end of the mandrel 172. The strip before being clamped to the mandrel is secured in frictional engagement with the plate or bar 211 carried by the bracket 167 by means of the clamping plate 212, the finger 207 being positioned between the walls of the fin. The fin is also secured by the clamping plates 225 and 226 which are disposed between the fin walls X and Y.

Thus the fin is led in a continuous movement through the bending means and through the guiding means, shown in Fig. 7, which is accurately adjusted to maintain the proper alinement or direction of feed of the strip. The bending rolls are driven through the friction clutch 85, 87 from the pulley 83. This pulley also drives the shaft 97 through the clutch teeth 95 and corresponding clutch teeth formed on the pulley, and the shaft 97 through the gear connections 185, 186 and 187 drives the shaft 188 which carries the gears 192. These gears successively mesh with the gear 173 which has a threaded hub 174 forming a nut which rotates on the threaded shaft 170. During this operation the shaft 170 is positively held against rotation by means of the locking staple 198 which engages a spoke of the pulley 195.

The gear 173 is carried by the mandrel 172 and causes the mandrel to rotate and move longitudinally through the bushing 182 carried by the bracket 167. As the mandrel is rotated, the clamping plate 212 which has been accurately adjusted to exert the desired pressure, clamps the fin in position and causes the fin to be wound tightly around the mandrel since the end of the fin is tightly clamped by the clamp 200 against the advance end of the mandrel.

After the fin has been wound to the desired extent on the mandrel it is severed and the motor for the pulley 83 is disconnected, the staple 198 is removed, and the pulley 195 is rotated in the manner above described to rotate the threaded shaft 178 in a direction to cause the mandrel to move longitudinally thereof and strip the coiled fin therefrom.

Although one specific embodiment of the invention has been particularly shown and described, it will be understood that the invention is capable of modification and that changes in the construction and in the arrangement of the various cooperating parts may be made without departing from the spirit or scope of the invention, as expressed in the following claims.

What I claim is:

1. In a machine of the character described, a rotatable mandrel, means for rotating said mandrel and for moving the mandrel axially, means for leading a double walled fin strip to the periphery of the mandrel with the fin disposed at right angles to the mandrel surface and the connected edge of the double wall disposed against the mandrel, means for clamping the fin strip to the mandrel, a fixed support adjacent the periphery of the mandrel and having a surface engageable with the outer surface of one of the fin walls, a clamping plate carried by said support and adjustable toward and away from said support surface and engageable with the outer surface of the other fin wall, means for holding said clamping plate in adjusted clamping position, and means for holding the fin walls in spaced relation, said clamping plate exerting pressure in a direction substantially parallel to the mandrel axis, whereby the outer portions of the walls of the fin strip will be stretched as the strip is wound on the mandrel.

2. In a machine of the character described, means for leading a double walled fin with the walls substantially parallel to the periphery of the mandrel, a mandrel rotatable on an axis disposed substantially at right angles to the path of the fin, means for guiding the fin to the periphery of the mandrel, means for rotating and moving the mandrel axially, means for securing the advance end of the fin to the mandrel, and means disposed at the periphery of the mandrel and including a fixed support engageable with the outer surface of one fin wall, spacing means between the fin walls, a clamping plate adjustable toward and from said support and engageable with the outer surface of the other fin wall, and means to hold said plate in adjusted position, for frictionally engaging the outer surfaces of the fin walls and guiding and insuring the coiling of the fin around the mandrel as the mandrel is rotated and moved axially.

3. In a machine of the character described, continuously operating means for leading a strip of material having a double walled fin and for advancing said fin to the periphery of a mandrel, a mandrel having a smooth outer surface for receiving and coiling said fin mounted on an axis substantially at right angles to the path of the fin, means for guiding the fin to the periphery of the mandrel, means for securing the advance end of the fin to the mandrel, means for rotating the mandrel and moving the mandrel axially, and means for holding the mandrel against rotation and withdrawing the mandrel longitudinally from the fin coil after the coil has been completed.

4. In a machine of the character described, means for advancing a fin strip on one edge, a threaded shaft, a mandrel having a threaded connection to the shaft and having its periphery disposed in substantial alinement with the said edge of the fin strip, the shaft and mandrel axis being disposed substantially at right angles to the path of movement of the strip, means for holding the threaded shaft against rotation, means for rotating the mandrel on the shaft, thereby moving the mandrel axially thereon, means for rotating the shaft in the mandrel to cause the mandrel to be withdrawn from the wound coil after the coil has been completed.

5. A machine for forming and winding double walled fins which comprises a plurality of successively acting feeding and folding means for feeding and bending a strip of material intermediate its longitudinal edges to form a fin having substantially parallel walls, a mandrel, means for securing the advance end of the double walled fin strip to the mandrel, means for rotating and moving the mandrel axially to wind the fin strip around the mandrel, and means disposed substantially in alinement with the path of feed of the strip for exerting frictional pressure on the walls of the strip as it is wound on the mandrel, said pressure means including a plate frictionally engaging the back wall, a spacing strip between the walls and an adjustable pressure plate frictionally engaging the front wall.

WILHELM B. BRONANDER.

REFERENCES CITED

The following references are of record in the file of this patent:

UNITED STATES PATENTS

| Number | Name | Date |
|---|---|---|
| 1,490,772 | Gunn | Apr. 15, 1924 |
| 434,804 | Quiggin | Aug. 19, 1890 |
| 1,216,657 | Cardell | Feb. 20, 1917 |
| 455,621 | Hicks | July 7, 1891 |
| 726,691 | Johnson | Apr. 28, 1903 |
| 2,209,472 | Pedaline | July 30, 1940 |
| 1,498,891 | Steenstrup | June 24, 1940 |

FOREIGN PATENTS

| Number | Country | Date |
|---|---|---|
| 52,466 | Swedish | Feb. 17, 1919 |